United States Patent
Durney et al.

(10) Patent No.: US 10,079,739 B2
(45) Date of Patent: Sep. 18, 2018

(54) COMPUTER-IMPLEMENTED METHOD FOR HANDLING LOG FILE

(71) Applicant: International Business Machines Corporation, Armonk, NY (US)

(72) Inventors: Jean-Philippe Durney, Grabels (FR); Jui Hsiang Huang, New Taipei (TW); Jeffrey C. H. Liu, Taipei (TW); Joey H. Y. Tseng, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 308 days.

(21) Appl. No.: 14/597,579

(22) Filed: Jan. 15, 2015

(65) Prior Publication Data
US 2015/0215181 A1  Jul. 30, 2015

(30) Foreign Application Priority Data
Jan. 29, 2014  (TW) .............................. 103103703 A (51) Int. Cl.
*G06F 15/16* (2006.01)
*G06F 15/173* (2006.01)
(Continued)

(52) U.S. Cl.
CPC ........ *H04L 43/062* (2013.01); *G06F 11/3476* (2013.01)

(58) Field of Classification Search
CPC ..... G06F 11/3476; H04L 43/062; H04L 67/02
(Continued)

(56) References Cited

U.S. PATENT DOCUMENTS 5,812,793 A  9/1998 Shakib et al.
5,966,714 A  10/1999 Huang et al.
(Continued)

FOREIGN PATENT DOCUMENTS

JP  2003140990 A  5/2003
TW  466476 B  12/2001
WO  2007059057 A2  5/2007

OTHER PUBLICATIONS

Durney et al., "Computer-Implemented Method for Handling Log File,"Filed on Jan. 29, 2014, p. 1-30, T.W. Patent Application Serial No. 103103703, English Translation Application and Drawings.
(Continued)

*Primary Examiner* — Moustafa M Meky
*Assistant Examiner* — Sahera Halim
(74) *Attorney, Agent, or Firm* — Minh-Hien Vo (57) ABSTRACT

A computer-implemented method for handling logs includes the steps of: accessing a log definition by an application, wherein the log definition describes a log message format including a first parameter and a second parameter, and assigns parameter identifications P1, P2 for the first parameter and the second parameter, respectively; the application generating a log message in the log message format, wherein the first log contains a combination of the parameter identification P1 and a value of the first parameter and a combination of the parameter identification P2 and a value of the second parameter; a log disseminating program, using the parameter identification P1, sending the value of the first parameter to a first recipient associated beforehand with the parameter identification P1; and the log disseminating program, using the parameter identification P2, sending the value of the second parameter to a second recipient associated beforehand with the parameter identification P2.

10 Claims, 3 Drawing Sheets

(51) Int. Cl.
*H04L 12/26* (2006.01)
*G06F 11/34* (2006.01)

(58) Field of Classification Search
USPC .......................................... 709/224, 223, 227
See application file for complete search history.

(56) References Cited

U.S. PATENT DOCUMENTS

| | | |
|---|---|---|
| 7,707,189 B2 | 4/2010 | Haselden et al. |
| 8,386,854 B2 | 2/2013 | Fernandess et al. |
| 2006/0182050 A1 | 8/2006 | Dohm |
| 2011/0055026 A1 | 3/2011 | Hayward |
| 2011/0066585 A1 | 3/2011 | Subrahmanyam et al. |
| 2012/0096465 A1 | 4/2012 | Kamishiro |
| 2012/0246303 A1 | 9/2012 | Petersen et al. |
| 2013/0073532 A1 | 3/2013 | Bachar et al. |

OTHER PUBLICATIONS

Jayathilake, "Towards Structured Log Analysis," Ninth International Joint Conference on Computer Science and Software Engineering (JCSSE), 2012, p. 259-264, IEEE.

Manageengine, "Event Log Management Software, Log Analyzer, Syslog Monitor," EventLog Analyzer Overview, Copyright 2015, p. 1-5, Zoho Corp., http://www.manageengine.com/products/eventlog/, Accessed on: Jan. 12, 2015.

COMPUTER-IMPLEMENTED METHOD FOR HANDLING LOG FILE

BACKGROUND

The present invention generally relates to computer-implemented methods for processing log files, and more particularly, to a computer-implemented method for disseminating log file messages of different formats selectively as needed or disseminating different portions of a log file message selectively as needed.

Log files created by a computer system can be used in analyzing and assessing the ongoing operation of the computer system. The computer system usually describes each log file in a specific log file message format. To serve different purposes, it is necessary that parameter fields of log file message formats vary from log file message format to log file message format. Log files come in different categories, such as request log files, manager log files, access log files, error log files, referral log files, and agent log files.

In another aspect, due to advancement of the Internet-related technology, Web log files are becoming more important. Web log files keep a record of the requests sent from users to Website servers through a browser and the history of the users' interaction with the servers. Analysis of Web log files is conducive to understanding precisely the operation performance and utilization of the Websites. Hence, the results of the analysis of Web log files serve as reference for efforts to improve the contents of the Websites and interpret users' browsing behavior.

For the prior art pertaining to processing log files, refer to U.S. Pat. No. 7,707,189 and WO 2007/059057.

SUMMARY

In an aspect, the present invention provides a method for processing log files, wherein only a log file message of a specific format or a specific portion (such as a value of a specific parameter) of a log file message is sent according to log file message recipient requirements or subscriptions so as to effectively enhance log file message recipient processing efficiency. Since the method does not require sending a log file message in its entirety, the method reduces a waste of network-based transmission resources and storage space greatly.

A single application is capable of creating log file messages of multiple formats. Take a Website server as an example, a basic log file message format is applicable to access log files and error log files. However, a log file message recipient may need only an access log file to perform an analysis with a specific objective but does not need any error log file. Unlike the present invention, the prior art does not give any consideration to the requirements of log file message recipient for performing analysis; hence, according to the prior art, typically, all the log file messages created by an application are completely sent to a log file message recipient. In the aforesaid exemplary embodiment, the access log file and the error log file are sent together, even though a log file message recipient only needs an access log file but does not need any error log file; as a result, the prior art not only increases log file message recipient processing time but also causes a waste of network-based transmission resources and storage space.

Hence, according to the present invention, log file messages of different formats are created by the same application and received at different log file message recipients, or different portions of the same log file message are received at different log file message recipients. However, the same log file message recipient is also applicable to the present invention such that, in response to a change in analysis requirement, it receives log file messages which are of different formats and are created by the same application or different portions of the same log file message.

According to an embodiment of the present invention, a computer-implemented method for processing log files, comprising the steps of: accessing, by an application, a log file definition describing a first log file message format comprising a first parameter and a second parameter, wherein the log file definition assigns parameter identifiers P1, P2 to the first parameter and the second parameter, respectively; creating a first log file message by the application according to the first log file message format, wherein the first log file message contains a combination of the parameter identifier P1 and a value of the first parameter and a combination of the parameter identifier P2 and a value of the second parameter; sending, by a log disseminating program according to the parameter identifier P1, the value of the first parameter in the first log file message to a first recipient associated with the parameter identifier P1 in advance; and sending, by the log disseminating program according to the parameter identifier P2, the value of the second parameter in the first log file message to a second recipient associated with the parameter identifier P2 in advance.

According to another embodiment of the present invention, a computer-implemented method for processing log files, comprising the steps of: accessing, by an application, a log file definition describing a first log file message format and a second log file message format, wherein the log file definition further assigns log file message format identifiers M1, M2 to the first log file message format and the second log file message format, respectively; creating a first log file message in the first log file message format by the application, wherein the first log file message further comprises the log file message format identifier M1; sending, by a log disseminating program according to the log file message format identifier M1, the first log file message to a first recipient whose association with the log file message format identifier M1 is created in advance; creating a second log file message in the second log file message format by the application, wherein the second log file message further comprises the log file message format identifier M2; and sending, by the log disseminating program according to the log file message format identifier M2, the second log file message to a second recipient whose association with the log file message format identifier M2 is created in advance.

The present invention provides, in another embodiment thereof, a computer program product stored in a computer-accessible medium. The computer program product comprises a computer-readable program executable on a computer system to implement the aforesaid methods.

In another embodiment, the present invention provides a computer system comprising a memory and a processor. The memory stores therein a computer executable command. The processor accesses the memory to execute the computer executable command for performing the aforesaid method.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment. Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The following description, the appended claims, and the embodiments of the present invention further illustrate the features and advantages of the present invention.

BRIEF DESCRIPTION OF THE SEVERAL VIEWS OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings.

DETAILED DESCRIPTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

As will be appreciated by one skilled in the art, the present invention may be embodied as a computer system/device, a method or a computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer or server may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
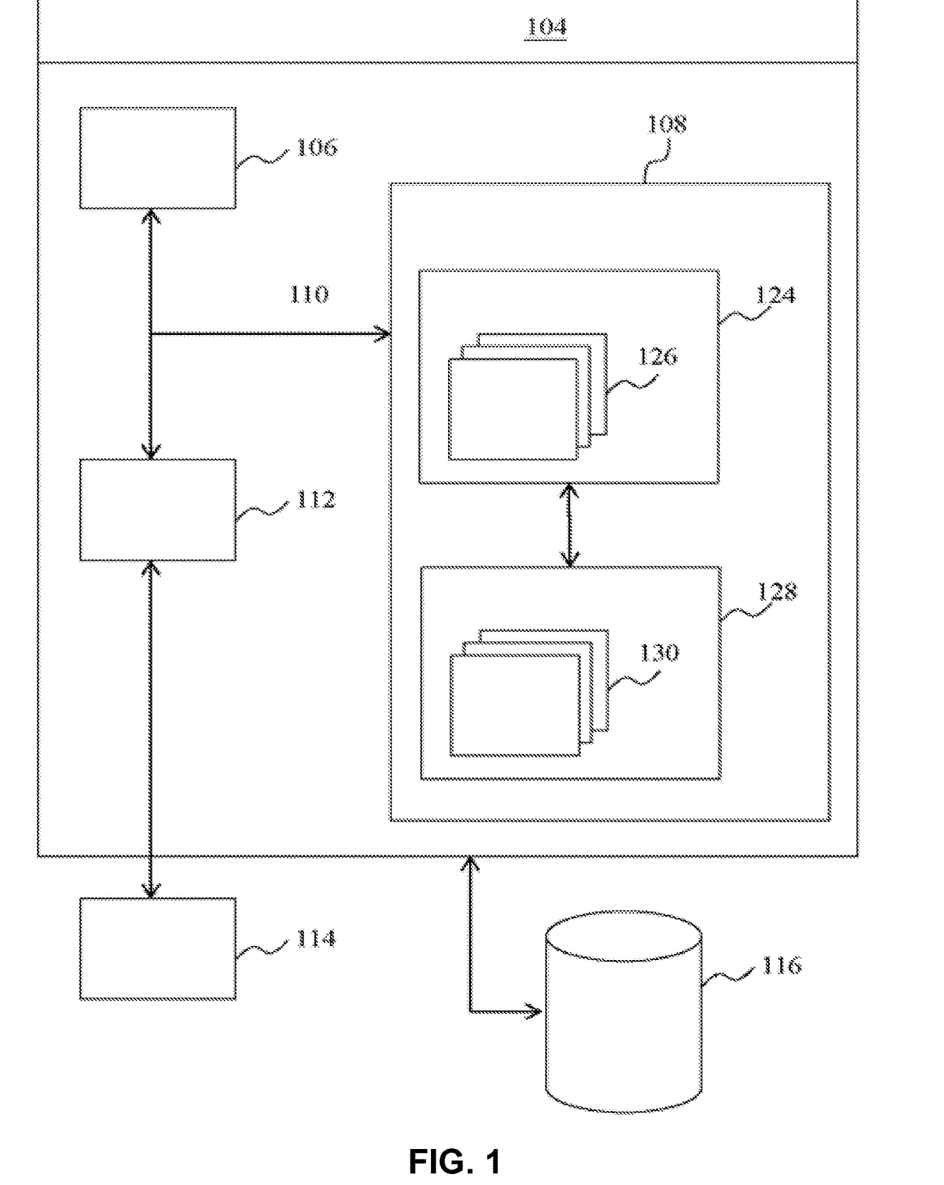
FIG. 1 is a schematic view of a computer system according to an embodiment of the present invention.
Figure 2:
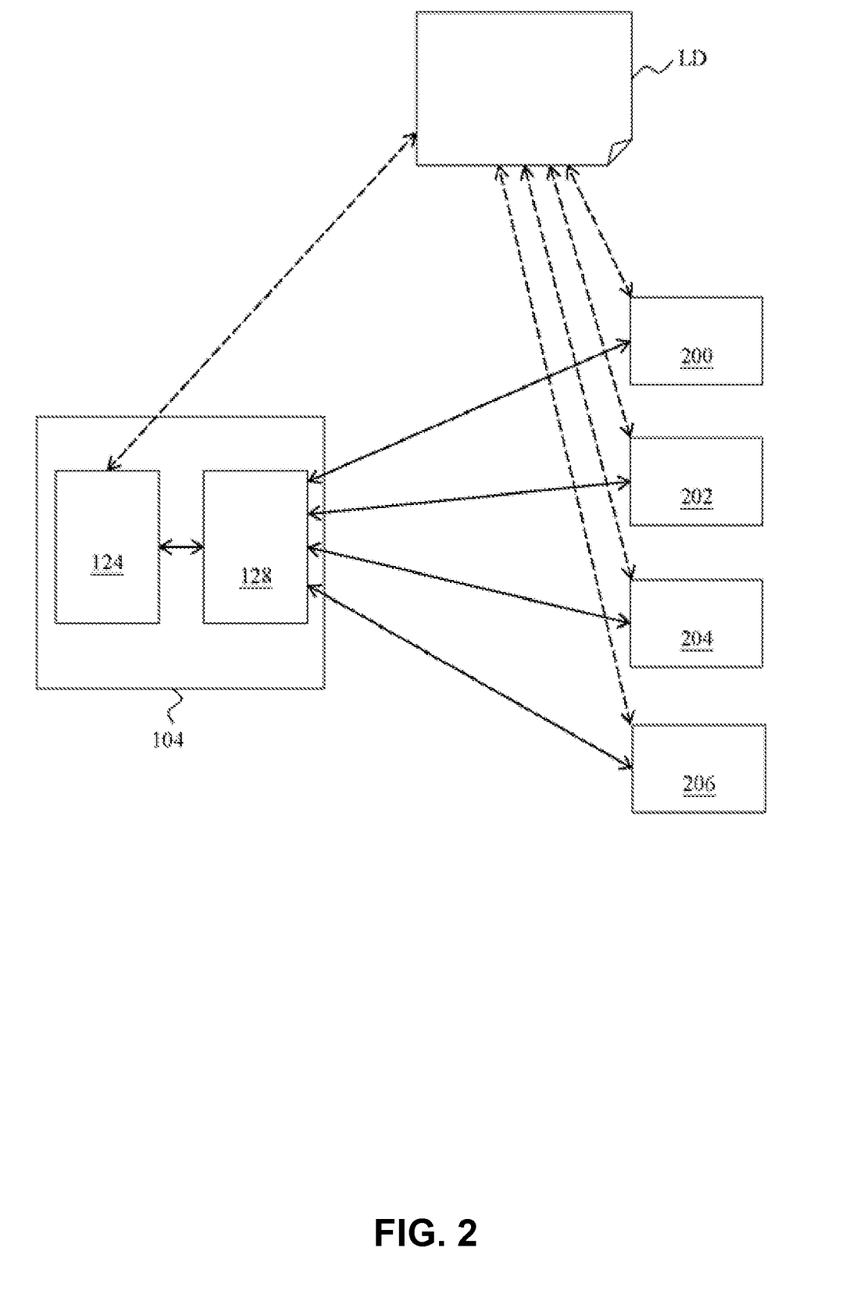
FIG. 2 is a schematic view of the computer system and log file message recipients thereof according to an embodiment of the present invention.
Figure 3:
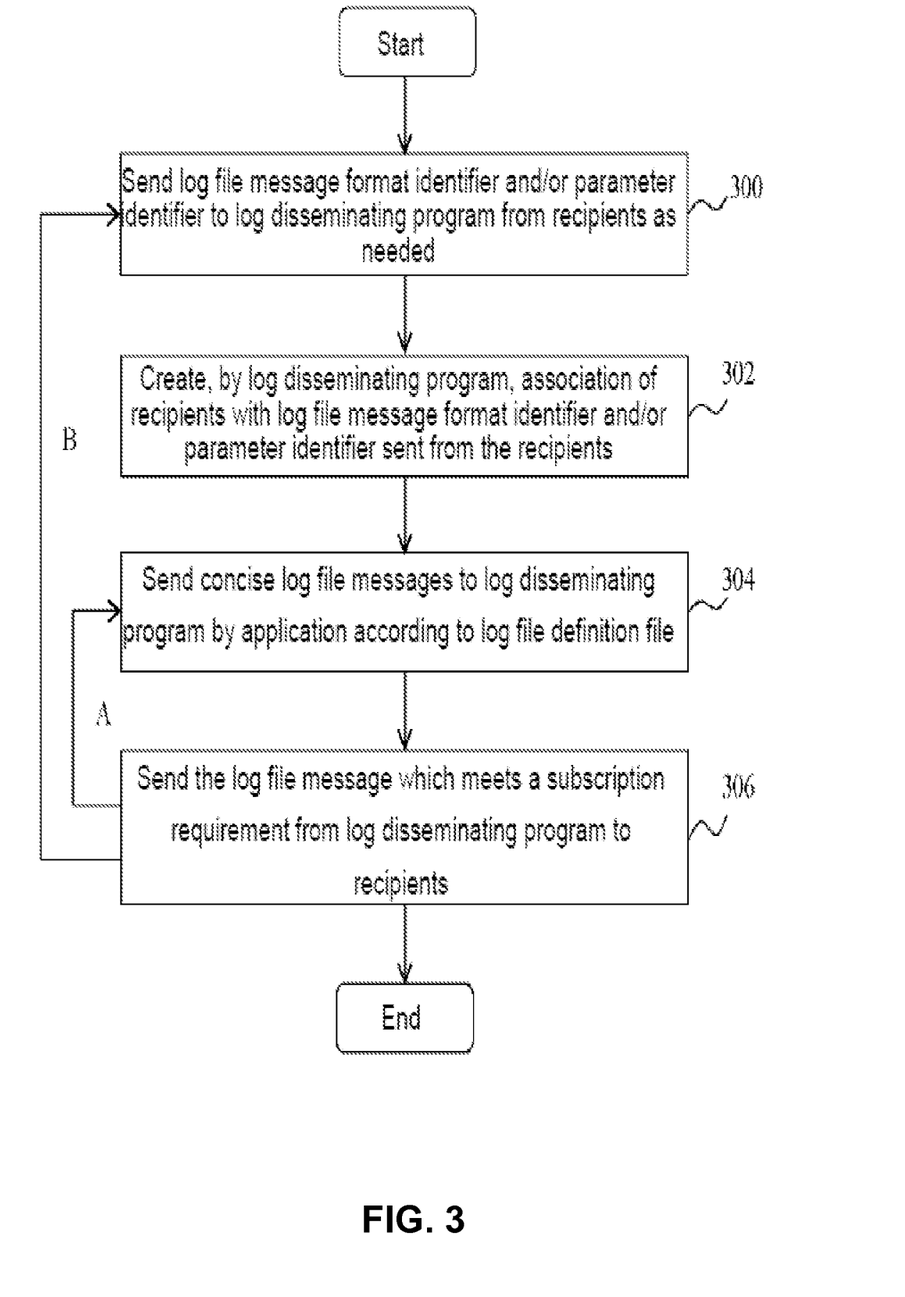
FIG. 3 is a flow chart of a method according to an embodiment of the present invention.

Referring now to FIG. 1 through FIG. 3, computer systems/devices, methods, and computer program products are illustrated as structural or functional block diagrams or process flowcharts according to various embodiments of the present invention. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

<System Framework>

FIG. 1 illustrates the hardware framework of a computer system 104 according to an embodiment of the present invention. The computer system 104 comprises a processor 106, a memory device 108, a bus 110, and a device interface 112. The processor 106 accesses program code, such as an application program 124 and a log disseminating program 128, in the memory device 108 or an external storage device 116. The application program 124 has one or more functional modules 126 and the log disseminating program 128 also one or more functional modules 130 for providing the functions (illustrated with FIG. 2 through FIG. 3 and described below) required by the present invention. The one or more functional modules 126 and 130 are a single instruction or multiple instructions distributed in multiple different program code segments, different programs, and multiple said memory devices 108.

The bus 110 functions as a communication link of various components in the computer system 104. The computer system 104 communicates with an external device 114 via the device interface 112. Furthermore, the computer system 104 communicates with the external device 114, the external storage device 116, or other computer devices/systems via a network. In this regard, the network can also come in the form of any type of connection, including a wide area network (WAN) or a local area network (LAN) of fixed connection, or dial-up Internet access service offered by an Internet service provider, and it is not restricted to wired or wireless connections. Furthermore, other hardware and software components (not shown, including additional computer systems, routers, and firewalls) can be included in the network.

In another embodiment, the basic framework and components of the computer system 104 can also come in the form of a typical personal computer or server, such as IBM's System X, Blade Center or eServer.

In a preferred embodiment, a computer system 104 comes in the form of a Webpage server, whereas an application 124 is exemplified by Apache HTTP Server application or IBM HTTP Server application, but persons skilled in the art understand that the present invention is not limited thereto.

Referring to FIG. 2, the application 124 creates a log file message and sends the log file message to one or more recipients 200-206 through a log disseminating program 128, but persons skilled in the art understand that the actual quantity of the recipients 200-206 is not restrictive of the present invention. The log disseminating program 128 preferably comes in the form of a local daemon, but the present invention is not limited thereto.

The computer system 104 communicates with the recipients 200-206 by communicating with an external device 114 or an external storage device 116. Moreover, in this embodiment, the recipients 200-206 come in the form of IBM's SIEM (security information and event management) products or conventional log file analysis devices, but the present invention is not limited thereto.

In another aspect, referring to FIG. 1 and FIG. 2, the application 124 and the log disseminating program 128 reside in the same said computer system 104 and are executed by the same hardware device (such as a processor 106). However, in another embodiment, the application 124 and the log disseminating program 128 are executed by different hardware devices, respectively, and thus communicate with each other through a connection or a network.

<Log File Definition>

In an embodiment of the present invention, the application 124 creates a log file definition file LD to be referred to by a log file message. From the perspective of the application 124, the log file definition file LD is stored beforehand in the external storage device 116 or is part of the program code of the application 124. Understandably, the recipients 200-206 have to refer to the log file definition file LD whenever the log file message created and sent by the application 124 is requested (or subscribed to) and subsequently analyzed. From the perspective of the recipients 200-206, either the log file definition file LD is stored in the recipients 200-206 in advance, or the recipients 200-206 can access an external storage device (not shown). The application 124 and the recipients 200-206 have to refer to the same log file definition file LD.

The log file definition file LD describes a plurality of log file message formats and assigns a log file message format identifier to each log file message format. Furthermore, each log file message format comprises a plurality of parameters, whereas the log file definition file LD also assigns a parameter identifier to each parameter.

For illustrative sake, an embodiment of the present invention is hereunder exemplified by the log file definition file LD (in XML file format, for example). In this embodiment, the log file definition file LD describes three log file message formats which are assigned log file message format identifiers id="1", id="2", and id="3", respectively, and described in the tag "entry name". A full log file message is described in the tag "text", and each log file message format has a plurality of parameters, such as Transaction-ID or Time (as is the case of the tag "name"). The log file definition file LD assigns a parameter identifier to each parameter and describes it in the tag "param pos". The log file message format comprises another tag for describing descriptive information conducive to interpreting the log file message at the recipients 200-206 and creating a user prompt message.

```
<entry name="transactioncompleted" id="1">
   <header-file>transactionStatus</header-file>
   <text>Receive Transaction (%d), From Host %s. Transaction
Completed</text>
   <param pos="1">
      <type>integer</type>
      <name>Transaction-ID</name>
   </param>
   <param pos="2">
      <type>string</type>
      <name>Host-Name</name>
   </param>
   <description>A received transaction from certain source host has
completed successfully.</description>
   <suggestion>n/a</suggestion>
</entry>
<entry name="systemstatus" id="2">
   <header-file>systemStatus</header-file>
   <text>Current system load %d, memory usage %d, At time %s</text>
   <param pos="1">
      <type>integer</type>
      <name>System-Loading</name>
   </param>
   <param pos="2">
      <type>integer</type>
      <name>Memory-Usage</name>
   </param>
   <param pos="3">
<type>string</type>
<name>Time</name>
   </param>
   <description>Display current system status at certain time.
   </description>
   <suggestion>n/a</suggestion>
</entry>
<entry name="insufficientresource_transactionaborted" id="3">
   <header-file>transactionStatus</header-file>
   <text>Insufficient resource. Transaction (%d) aborted. Error Code %d
   </text>
   <param pos="1">
      <type>integer</type>
      <name>Transaction-ID</name>
   </param>
   <param pos="2">
      <type>integer</type>
      <name>Error-Code</name>
   </param>
   <description>Transaction failure due to insufficient resource
available.</description>
   <suggestion>Please check system status and reallocate resource
accordingly.</suggestion>
</entry>
```

<Process Flow of Method>

Referring to FIG. 3, there is shown a flow chart of a computer-implemented method for processing log files by the computer system 104 in FIG. 1 and FIG. 2 according to an illustrative embodiment of the present invention.

Step 300: sending from each of the recipients 200-206 a log file message format identifier and a parameter identifier to the log disseminating program 128 as needed. For example, the recipient 200 sends the log file message format identifier (id) "1" and the parameter identifier (param pos) "1" to the log disseminating program 128 and thereby "subscribes" to the log disseminating program 128 for the value of a parameter (i.e., Transaction-ID, in this example) of the corresponding parameter identifier (param pos) "1" in the log file message of the log file message format identifier (id) "1". Likewise, the recipient 202 sends the log file message format identifier (id) "1" and the parameter identifiers (param pos) "1" and "2" to the log disseminating program 128 and thereby "subscribes" to the log disseminating program 128 for the value of a parameter (i.e., Transaction-ID and Host-Name, in this example) of the corresponding parameter identifier (param pos) "1" and "2" in the log file message of the log file message format identifier (id) "1".

In another aspect, the recipient 204 sends the log file message format identifier (id) "3" and the parameter identifier (param pos) "2" to the log disseminating program 128 and thereby "subscribes" to the log disseminating program 128 for the value of a parameter (i.e., Error-Code, in this example) of the corresponding parameter identifier (param pos) "2" in the log file message of the log file message format identifier (id) "3".

In yet another aspect, the recipient 206 sends the log file message format identifier (id) "2" and the parameter identifier (param pos) "2" as well as the log file message format identifier (id) "3" and the parameter identifier (param pos) "1" to the log disseminating program 128 and thereby "subscribes" to the log disseminating program 128 for the value of a parameter (i.e., Memory-Usage, in this example) of the corresponding parameter identifier (param pos) "2" in the log file message of the log file message format identifier (id) "2" and "subscribes" for the value of a parameter (i.e., Transaction-ID, in this example) of the corresponding parameter identifier (param pos) "1" in the log file message of the log file message format identifier (id) "3".

Step 302: receiving and storing by the log disseminating program 128 the log file message format identifier and the parameter identifier sent from each of the recipients 200-206 as needed, so as to create the association of each of the recipients 200-206 with the log file message format identifier and the parameter identifier sent therefrom.

Step 304: determining, by the application 124 and according to a predetermined rule, the timing of creating log file messages of different formats. To create a log file message, the application 124 accesses and refers to the log file definition file LD and thus only sends the log file message format identifier, the parameter identifier, and the value of the parameter indicated by the parameter identifier to the log disseminating program 128 but does not send the full log file message (i.e., described in the tag "text" in the log file definition file LD), thereby dispensing with any text message mainly intended to be read by a user. Take the log file message format identifier (id) "1" as an example, the full log file message is {Receive Transaction (% d), From Host % s. Transaction Completed}. The application 124 does not send this full message but only sends the concise log file message {id="1"; param pos="1": "1347"; param pos="2": "10.1.1.100"} to the log disseminating program 128, wherein the value of parameter Receive Transaction is "1347", and the value of parameter From Host is "10.1.1.100". In an embodiment, the application 124 sends the concise log file message in JSON (JavaScript Object Notation) format.

Step 306: checking, by the log disseminating program 128 after receiving the concise log file message sent from the application 124, the concise log file message to determine whether the concise log file message meets a subscription requirement of any one of the recipients 200-206 (that is, the log file message format identifier and the parameter identifier sent from the recipients 200-206 to the log disseminating program 128 in step 300.)

Take the above the concise log file message {id="1"; param pos="1": "1347"; param pos="2": "10.1.1.100"} sent from the application 124 as an example, in step 300, the recipient 200 sends the log file message format identifier (id) "1" and the parameter identifier (param pos) "1" to the log disseminating program 128, and thus the log disseminating program 128 sends to the recipient 200 the log file message { id="1"; param pos="1": "1347"} further selected by the log disseminating program 128, without sending param pos="2": "10.1.1.100" to the recipient 200, because the recipient 200 is not subscribed. In step 300, the recipient 202 sends the log file message format identifier (id) "1" and the parameter identifiers (param pos) "1", "2" to the log disseminating program 128, and thus the log disseminating program 128 sends the log file message {id="1"; param pos="1": "1347"; param pos="2:" 10.1.1.100"} to the recipient 202. Both the recipients 204, 206 do not meet the subscription requirement, and thus the log disseminating program 128 does not send any message to the recipients 204, 206.

Take the recipient 206 as an example, in the situation where the subscription requirement comprises at least two log file message formats (i.e., the two log file message format identifiers (id) "2", "3" sent in step 300), if the concise log file message sent from the application 124 meets one of the two log file message format identifiers (id) "2", "3", the log disseminating program 128 will send the complying log file message to the recipient (but the log disseminating program 128 will still have to give consideration to the parameter identifier to determine whether to further select a parameter of the log file message.)

Step 306 either marks the end of the process flow of the method or allows the process flow of the method to go back to step 304 (as indicated by arrow A) so as to wait for the next concise log file message created by the application 124. Alternatively, upon completion of step 306, the process flow of the method goes back to step 300 (as indicated by arrow B) in which any one of the recipients 200-206 determines anew the log file message format identifier and parameter identifier to be sent to the log disseminating program 128, thereby setting anew the subscription requirement with regard to the log disseminating program 128. The above technique is advantageous, because an analysis of the recipient 200 is performed according to the existing log file message locally (such as {id="1"; param pos="1": "1347"}), and it is only when any abnormal phenomenon is discovered that an additional subscription is made to the log disseminating program 128 for a log file message of another format or another parameter (such as {id="1"; param pos="2": "10.1.1.100"}) in a log file message in order to be further analyzed. Hence, it is not necessary to request the aforesaid data from the very beginning and thus cause a waste of network bandwidth and storage space.

In an optional embodiment, the log file definition file LD is assigned a log file message format identifier only with regard to a log file message format, but no parameter identifier is assigned to any parameter in each log file message format; hence, in step 300, an recipient can only send the log disseminating program 128 the log file message format identifier serving as a unique subscription requirement, but persons skilled in the art understand that the aforesaid technique falls into the intended scope of the present invention.

In another embodiment, if the application 124 creates log file messages of a single format only, the log file definition file LD can assign a parameter identifier which is directed only to the parameter in the log file message format and thus dispenses with the log file message format identifier, but persons skilled in the art understand that the aforesaid technique falls into the intended scope of the present invention.

The present invention can be embodied in any other specific manners without departing from the spirit or essential features of the present invention. Every aspect of the aforesaid embodiments of the present invention must be deemed illustrative rather than restrictive of the present invention. Hence, the scope of the present invention is defined by the appended claims instead of the above description. All equivalent meanings and scope which fall within the appended claims must be deemed falling within the scope of the appended claims.

What is claimed is:

1. A computer-implemented method for processing log files created by a computer system associated with a webpage server, wherein the processing of the log files reduces an original size of the log files comprising:
   accessing, by a server application executed by a processor of the webpage server, an online log file definition describing a first log file message format comprising a first parameter and a second parameter, wherein the online log file definition assigns parameter identifiers P1, P2 to the first parameter and the second parameter, respectively, and wherein the parameter identifiers P1 and P2 correspond to metadata associated with textual data electronically stored in a log file;
   creating, by the server application executed by the processor of the webpage server, an online first log file message by the server application according to the first online log file message format, wherein the first online log file message contains a combination of the parameter identifier P1 and a value of the first parameter and a combination of the parameter identifier P2 and a value of the second parameter;
   sending, electronically via an electronic communications network, by a log disseminating program executed by the processor of the webpage server, according to the parameter identifier P1, the value of the first parameter in the first online log file message to a first recipient associated with the parameter identifier P1 in advance; and
   sending, electronically via an electronic communications network, by the log disseminating program executed by the processor of the webpage server, according to the parameter identifier P2, the value of the second parameter in the online first log file message to a second recipient associated with the parameter identifier P2 in advance, wherein the value of the first parameter and the value of the second parameter reduce an original size of the first log file and are sent simultaneously to the first recipient and the second recipient, and wherein the first recipient is using a first computer to electronically receive the value of the first parameter and the second recipient is using a second computer to electronically receive the value of the second parameter.

2. The method of claim 1, prior to sending by the log disseminating program the value of the first parameter, further comprising:
   receiving the parameter identifier P1 from the first recipient and associating the parameter identifier P1 with the first recipient by the log disseminating program before sending the value of the first parameter by the log disseminating program; and
   receiving the parameter identifier P2 from the second recipient and associating the parameter identifier P2 with the second recipient by the log disseminating program after sending the value of the first parameter by the log disseminating program and before sending the value of the second parameter by the log disseminating program.

3. The method of claim 2, wherein the first recipient is identical to the second recipient, and the first recipient is associated with at least two distinct log file message formats.

4. The method of claim 1, further comprising:
assigning a log file message format identifier M1 to the first log file message format by the log file definition, wherein the first log file message further comprises the log file message format identifier M1;
sending the value of the first parameter in the first log file message, by the log disseminating program according to the log file message format identifier M1 and the parameter identifier P1, to the first recipient whose association with the log file message format identifier M1 and the parameter identifier P1 is created in advance; and
sending the value of the second parameter in the first log file message, by the log disseminating program according to the log file message format identifier M1 and the parameter identifier P2, to the second recipient whose association with the log file message format identifier M1 and the parameter identifier P2 is created in advance.

5. The method of claim 4, further comprising:
creating a second log file message in the second log file message format by the application, wherein the second log file message contains a combination of a parameter identifier P3 and a value of the third parameter and a combination of a parameter identifier P4 and a value of the fourth parameter;
sending a value of the third parameter in the second log file message, by the log disseminating program according to the log file message format identifier M2 and the parameter identifier P3, to a third recipient whose association with the log file message format identifier M2 and the parameter identifier P3 is created in advance; and
sending a value of the fourth parameter in the second log file message, by the log disseminating program according to the log file message format identifier M2 and the parameter identifier P4, to a fourth recipient whose association with the log file message format identifier M2 and the parameter identifier P4 is created in advance,
wherein the log file definition further describes a second log file message format comprising a third parameter and a fourth parameter, such that the log file message format identifier M2 is assigned to the second log file message format, and assigns parameter identifiers P11, P12 are assigned to the third parameter and the fourth parameter, respectively.

6. The method of claim 5, prior to sending by the log disseminating program the value of the first parameter, further comprising:
receiving the log file message format identifier M1 and the parameter identifier P1 from the first recipient and associating the log file message format identifier M1 and the parameter identifier P1 with the first recipient by the log disseminating program before sending a value of the first parameter by the log disseminating program; and
receiving the log file message format identifier M2 and the parameter identifier P3 from the third recipient and associating the log file message format identifier M2 and the parameter identifier P3 with the third recipient by the log disseminating program before sending a value of the third parameter by the log disseminating program.

7. A computer-implemented method for processing log files created by a computer system associated with a web-page server, wherein the processing of the log files reduces an original size of the log files, comprising:
accessing, by a server application, an online log file definition describing a first log file message format and a second log file message format, wherein the log file definition further assigns log file message format identifiers M1, M2 to the first log file message format and the second log file message format, respectively;
creating an online first log file message in the first log file message format by the server application, wherein the first log file message further comprises the log file message format identifier M1;
sending, electronically by a log disseminating program according to the log file message format identifier M1, the first log file message to a first recipient whose association with the log file message format identifier M1 is created in advance;
creating an online second log file message in the second log file message format by the server application, wherein the second log file message further comprises the log file message format identifier M2; and
sending, by the log disseminating program according to the log file message format identifier M2, the online second log file message to a second recipient whose association with the log file message format identifier M2 is created in advance, wherein the value of the first parameter and the value of the second parameter reduce an original size of the first log file and are sent simultaneously to the first recipient and the second recipient, and wherein the first recipient is using a first computer to electronically receive the value of the first parameter and the second recipient is using a second computer to electronically receive the value of the second parameter.

8. The method of claim 7, prior to sending by the log disseminating program the first log file message, further comprising:
receiving the log file message format identifier M1 from the first recipient and associating the log file message format identifier M1 with the first recipient by the log disseminating program before sending the first log file message by the log disseminating program; and
receiving the log file message format identifier M2 from the second recipient and associating the log file message format identifier M2 with the second recipient by the log disseminating program after sending the first log file message by the log disseminating program and before sending the second log file message by the log disseminating program.

9. The method of claim 8, wherein the first recipient is identical to the second recipient.

10. A computer system, comprising:
a host, comprising:
a bus system;
a memory connected to the bus system, wherein the memory stores therein a computer-executable command; and
a processing unit connected to the bus system, wherein the processing unit executes the computer-executable command to implement a method for processing log files created by a computer system associated with a web-page server, wherein the processing of the log files reduces an original size of the log files, comprising:
accessing, by a server application, an online log file definition describing a first log file message format comprising a first parameter and a second parameter, wherein the online log file definition assigns parameter identifiers P1, P2 to the first parameter and the second parameter, respectively;

creating an online first log file message by the server application according to the first online log file message format, wherein the first online log file message contains a combination of the parameter identifier P1 and a value of the first parameter and a combination of the parameter identifier P2 and a value of the second parameter;

sending, electronically by a log disseminating program according to the parameter identifier P1, the value of the first parameter in the online first log file message to a first recipient associated with the parameter identifier P1 in advance; and sending, electronically, by the log disseminating program according to the parameter identifier P2, the value of the second parameter in the first online log file message to a second recipient associated with the parameter identifier P2 in advance, wherein the value of the first parameter and the value of the second parameter reduce an original size of the first log file and are sent simultaneously to the first recipient and the second recipient, and wherein the first recipient is using a first computer to electronically receive the value of the first parameter and the second recipient is using a second computer to electronically receive the value of the second parameter.

\* \* \* \* \*